United States Patent
Huh

(10) Patent No.: US 9,637,577 B2
(45) Date of Patent: May 2, 2017

(54) MIXED PTFE POWDER AND A HIGH DENSITY MULTI EXPANDED (HDME) PTFE YARN WITH EXCELLENT TENSILE STRENGTH USING THE PTFE POWDER, AND METHODS OF PREPARING THE SAME

(71) Applicant: Ji Joong Hae Ind. Co., Ltd., Seoul (KR)

(72) Inventor: Kwang Huh, Seoul (KR)

(73) Assignee: Ji Joong Hae Ind. Co., Ltd., Seoul (KR)

( * ) Notice: Subject to any disclaimer, the term of this patent is extended or adjusted under 35 U.S.C. 154(b) by 0 days.

(21) Appl. No.: 15/135,158

(22) Filed: Apr. 21, 2016

(65) Prior Publication Data

US 2016/0319055 A1    Nov. 3, 2016

(30) Foreign Application Priority Data

Apr. 28, 2015  (KR) .................. 10-2015-0059625

(51) Int. Cl.
*C08F 114/26*  (2006.01)
*B29C 47/00*   (2006.01)
(Continued)

(52) U.S. Cl.
CPC ............ *C08F 114/26* (2013.01); *B29C 43/24* (2013.01); *B29C 47/0014* (2013.01); *C08L 3/12* (2013.01);
(Continued)

(58) Field of Classification Search
None
See application file for complete search history.

(56) References Cited

U.S. PATENT DOCUMENTS

2004/0175567 A1* 9/2004 Huang ............... D01D 5/423
                                                    428/393
2007/0122687 A1* 5/2007 Sakurai ............ B01D 39/1653
                                                    442/59

FOREIGN PATENT DOCUMENTS

JP           2004-244787          9/2004

* cited by examiner

*Primary Examiner* — Tahseen N Khan
(74) *Attorney, Agent, or Firm* — Kim Winston LLP

(57) ABSTRACT

A mixed PTFE powder according to the present invention is prepared by the steps of preparing a PTFE mixed dispersion by dispersing $MoS_2$, $Al_2O_3$, and $Al(OH)_3$ in a PTFE emulsion; dehydrating the PTFE mixed dispersion by adding $Na_2CO_3$ into the PTFE mixed dispersion to form a cake type compound; preparing an ingot by drying the cake type compound for about 16 to 24 hours at the temperature of about 120 to 190° C.; and pulverizing the ingot in a 30-35 mesh vibrating net. An HDME PTFE yarn according to the present invention is prepared by the steps of preparing the mixed PTFE powder; adding kerosene of about 18 to 25 wt. % as solvent to the mixed PTFE powder and maintaining the resultant for about 40 to 50 hours at the temperature of about 30 to 50° C.; extruding the resulting mixed PTFE into the form of rod at about 70 to 90° C.; calendering the rod into the form of sheet at about 100 to 150° C., the width of the sheet being about 100 to 300 mm and the thickness about 0.3 to 0.7 mm; folding the sheet to become a three layered sheet and passing through the three layered sheet in an oven of about 250 to 270° C. at a speed of about 10 to 40 cm per second; and drawing the three-layered sheet at the temperature of about 450 to 500° C. at the speed of about 30 to 100 cm/s and the drawing ratio of about 200 to 600%.

20 Claims, 2 Drawing Sheets

(51) Int. Cl.
*B29C 43/24* (2006.01)
*C08L 3/12* (2006.01)
*D01D 1/02* (2006.01)
*D01F 1/02* (2006.01)
*D01F 6/12* (2006.01)
*B29K 27/18* (2006.01)
*B29L 31/00* (2006.01)
*B29L 31/26* (2006.01)

(52) U.S. Cl.
CPC ............... *D01D 1/02* (2013.01); *D01F 1/02* (2013.01); *D01F 6/12* (2013.01); *B29C 47/004* (2013.01); *B29C 47/0016* (2013.01); *B29K 2027/18* (2013.01); *B29L 2031/265* (2013.01); *B29L 2031/707* (2013.01)

MIXED PTFE POWDER AND A HIGH DENSITY MULTI EXPANDED (HDME) PTFE YARN WITH EXCELLENT TENSILE STRENGTH USING THE PTFE POWDER, AND METHODS OF PREPARING THE SAME

CROSS-REFERENCE TO RELATED APPLICATION

This application claims priority from Korean Patent Application No. 10-2015-0059625 filed in the Korean Intellectual Property Office on Apr. 28, 2015, the entire disclosure of which is incorporated herein by reference.

TECHNICAL FIELD

The present invention relates to a mixed polytetrafluoroethylene (PTFE) powder and a high density multi expanded (HDME) PTFE yarn with excellent tensile strength using the mixed PTFE powder. Specifically, the present invention provides a method of preparing the mixed PTFE powder and a method of preparing the HDME PTFE yarn with excellent tensile strength using the mixed PTFE powder.

BACKGROUND OF THE INVENTION

PTFE has been used as a key material of gland packing in a form of braided string. Gland packing is a sealant to prevent leakages of gas, liquid, and steam, thereby it is an essential part in all sorts of valves and pumps in power plants, factories, and petrochemical facilities. Gland packing is generally jammed into a stuffing box to seal a rotating or reciprocating shaft for the prevention of gas, liquid, and steam leakages. Gland packing requires a perfect sealability, thus PTFE braided packing should have high tensile strength as well as excellent durability.

Japanese Patent Publication No. 2004-244787 discloses a method of making PTFE filaments. In the method, after a heat treatment process of a biaxially drawn PTFE film, the PTFE filaments are obtained by slitting the film partially in length. The PTFE filaments correspond to the HDME PTFE yarn of the present invention. In the specification, the term 'mixed PTFE powder' means a PTFE powder including PTFE as a principal ingredient as well as other components.

A GORE® or GFO® fiber, prepared by mixing a PTFE powder with graphite, is used as a material of gland packing. Braided packing made by a GORE® or GFO® fiber is widely used in valves, rotational machineries, pumps, or agitators because it has chemical and thermal resistance due to the characteristics of PTFE and graphite.

However, the GORE® or GFO® fiber used in gland packing and the PTFE filaments of Japanese Patent Publication No. 2004-244787 have the limitation of tensile strength for the durability of gland packing.

The inventors develop a mixed PTFE powder and an HDME PTFE yarn with excellent tensile strength using the PTFE powder for gland packing. The HDME PTFE yarn of the present invention may also be applied to a timing belt in an internal combustion engine, a v-belt, automobiles, airplanes, high-speed trains, and rockets.

OBJECTS OF THE INVENTION

An object of the present invention is to provide a new mixed PTFE powder for preparing an HDME PTFE yarn with high tensile strength capable of a material of gland packing.

Another object of the present invention is to provide an HDME PTFE yarn with high tensile strength using the mixed PTFE powder.

A further object is to provide a method of preparing the mixed PTFE powder.

A further object is to provide a method of preparing the HDME PTFE yarn with high tensile strength capable of a material of gland packing.

The objects above and others of the present invention can be achieved through the present invention which is described in detailed as follow.

SUMMARY OF THE INVENTION

A mixed PTFE powder according to the present invention is prepared by the steps of:

preparing a PTFE mixed dispersion by dispersing $MoS_2$, $Al_2O_3$, and $Al(OH)_3$ in PTFE emulsion having 10 to 25% by weight of solid PTFE;

dehydrating the PTFE mixed dispersion by adding $Na_2CO_3$ into the PTFE mixed dispersion in order to remove the solid PTFE, $MoS_2$, $Al_2O_3$, and $Al(OH)_3$ from the PTFE mixed dispersion to form a cake type compound;

preparing an ingot by drying the cake type compound for about 16 to 24 hours at the temperature of about 120 to 190° C.; and pulverizing the ingot in a 30-35 mesh vibrating net.

In the PTFE mixed dispersion, it is preferable that PTFE emulsion is 75 to 90 wt. %, $MoS_2$ 10 to 30 wt. %, $Al_2O_3$ 1 to 5 wt. %, and $Al(OH)_3$ 1 to 5 wt. %. In the step of dehydrating, it is preferable that $Na_2CO_3$ is added about 0.01 wt. %.

An HDME PTFE yarn according to the present invention is prepared by the steps of:

preparing a mixed PTFE powder according to the present invention above;

adding kerosene of about 18 to 25 wt. % as solvent to the mixed PTFE powder and maintaining the resultant for about 40 to 50 hours at the temperature of about 30 to 50° C. so as to become squash like a taffy;

extruding the resulting mixed PTFE into the form of rod at about 70 to 90° C., the cross section of the rod being circular or oval;

calendering the rod into the form of sheet at about 100 to 150° C., the width of the sheet being about 100 to 300 mm and the thickness about 0.3 to 0.7 mm;

folding the sheet to become a three layered sheet and passing through the three layered sheet in an oven of about 250 to 270° C. at a speed of about 10 to 40 cm per second; and drawing the three-layered sheet at the temperature of about 450 to 500° C. at the speed of about 30 to 100 cm/s and the drawing ratio of about 200 to 600%.

Before taking the step of extruding into the form of rod, it is preferable to carry out a dry process. The goal of the dry process is to reduce moisture content of the mixed PTFE below 0.03 wt. % in a way that mixed PTFE is kept at a low temperature of about 1 to 3° C. for about 20 to 30 hours.

It is preferable that the specific gravity of that rod is about 1.5.

The step of folding the sheet into a three layered sheet helps the HDME PTFE yarn have a uniform tension. The step of drawing of the three-layered sheet is preferably carried out in the manner of multi-drawing. The multi-drawing is carried out with multiple drawing rolls. Preferably, 5 step drawing may be performed with 5 drawing rolls in the present invention. For a preferable embodiment with the 5 step drawing, a three-folded sheet is drawn at a draw ratio of 120% through the first roll, at 50% through the second roll, at 60% through the third roll, at 30% through the fourth roll, and at 15% through the fifth roll.

After the step of drawing, a slit process can be further performed. The purpose of the slit process is to make longitudinal slits repeatedly and continuously The slit process may refer to a brush or a knife process.

After the slit process, the HDME PTFE yarn has a spider web structure by forming continuously repeated slits in the longitudinal direction. A spider web structure can be identified when the HDME PTFE yarn is unrolled in the width direction. The HDME PTFE yarn is rolled up like a string by the tension incurred through the drawing process.

The HDME PTFE yarn prepared by the process described above has a diameter of about 1 to 3 mm and a weight of about 1 to 10 g per meter.

The detailed description of the present invention will follow along with the accompanying drawings.

DETAILED DESCRIPTION OF THE INVENTION

Figure 1:
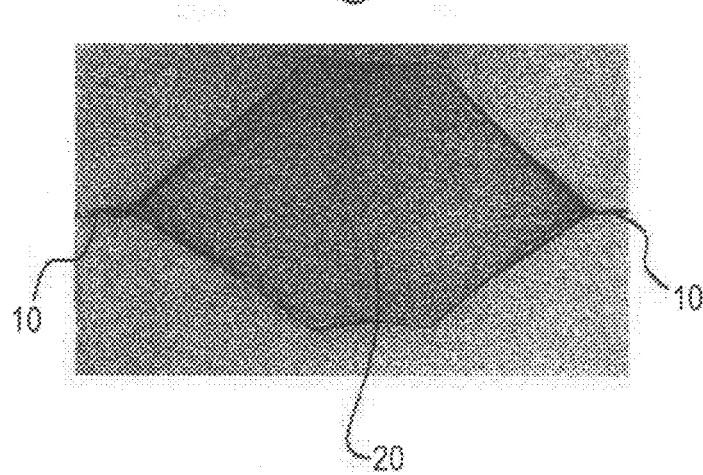
FIG. 1 is a picture that shows a spider web structure of a mixed PTFE yarn through opening the central part.

The present invention relates to a mixed polytetrafluoroethylene (PTFE) powder and a high density multi expanded (HDME) PTFE yarn with excellent tensile strength using the mixed PTFE powder. In particular, the present invention provides a method of preparing the mixed PTFE powder and a method of preparing the HDME PTFE yarn with excellent tensile strength using the mixed PTFE powder.

(1) Preparation of Mixed PTFE Powder

A mixed PTFE powder according to the present invention is prepared by the steps of preparing a PTFE mixed dispersion by dispersing $MoS_2$, $Al_2O_3$, and $Al(OH)_3$ in PTFE emulsion having 10 to 25% by weight of solid PTFE; dehydrating the PTFE mixed dispersion by adding $Na_2CO_3$ into the PTFE mixed dispersion in order to remove the solid PTFE, $MoS_2$, $Al_2O_3$, and $Al(OH)_3$ from the PTFE mixed dispersion to form a cake type compound; preparing an ingot by drying the cake type compound for about 16 to 24 hours at the temperature of about 120 to 190° C.; and pulverizing the ingot in a 30-35 mesh vibrating net.

In the PTFE mixed dispersion, it is preferable that PTFE emulsion is 75 to 90 wt. %, $MoS_2$ 10 to 30 wt. %, $Al_2O_3$ 1 to 5 wt. %, and $Al(OH)_3$ 1 to 5 wt. %. In the step of dehydrating, it is preferable that $Na_2CO_3$ is added about 0.01 wt. %.

Conventionally, the PTFE was employed in the form of powder for mixing with $MoS_2$, $Al_2O_3$, and $Al(OH)_3$. However, in the present invention, the use of PTFE in the form of emulsion is deemed to increase significantly the tensile strength of the PTFE yarn. The molecular weight of PTFE is preferably in the range of about 7,000,000 to 30,000,000. It is preferable that $MoS_2$ has a purity of 99.5% or more and a diameter of about 1.4 μm, $Al_2O_3$ has a purity of 99.6% or more and a diameter of about 1 μm, and $Al(OH)_3$ has a purity of 99% or more and a diameter of about 1 μm. These ingredients are dispersed in emulsion at room temperature, and then are stirred by adding $Na_2CO_3$ into the liquid. $Na_2CO_3$ leads to remove solid content of PTFE, $MoS_2$, $Al_2O_3$, and $Al(OH)_3$ from the liquid easily, thus the PTFE mixture becomes a cake type compound. An ingot is obtained by drying the cake type compound for about 16 to 24 hours at the temperature of about 120 to 190° C., and is pulverized in a 30-35 mesh vibrating net to produce a mixed PTFE powder with a diameter of about 350 to 550 μm.

(2) Preparation of DIME PTFE Yarn

An HDME PTFE yarn according to the present invention is prepared by the steps of preparing a mixed PTFE powder according to the present invention above; adding kerosene of about 18 to 25 wt. % as solvent to the mixed PTFE powder and maintaining the resultant for about 40 to 50 hours at the temperature of about 30 to 50° C. so as to become squash like a taffy; extruding the resulting mixed PTFE into the form of rod at about 70 to 90° C., the cross section of the rod being circular or oval; calendering the rod into the form of sheet at about 100 to 150° C., the width of the sheet being about 100 to 300 mm and the thickness about 0.3 to 0.7 mm; folding the sheet to become a three layered sheet and passing through the three layered sheet in an oven of about 250 to 270° C. at a speed of about 10 to 40 cm per second; and drawing the three-layered sheet at the temperature of about 450 to 500° C. at the speed of about 30 to 100 cm/s and the drawing ratio of about 200 to 600%.

a. Drying Step

Before taking the step of extruding into the form of rod, it is preferable to carry out a dry process. The goal of the dry process is to reduce moisture content of the mixed PTFE below 0.03 wt. % in a way that mixed PTFE is kept at a low temperature of about 1 to 3° C. for about 20 to 30 hours.

b. Step of Adding Kerosene

Kerosene of about 18 to 25 wt. % as solvent is added to the mixed PTFE powder and the resultant is maintained for about 40 to 50 hours at the temperature of about 30 to 50° C. so as to become squash like taffy. This step is for warming the resultant to become squash like taffy.

c. Step of Extruding

The resulting mixed PTFE is extruded into the form of rod at about 70 to 90° C. The rod has a cross section of being circular or oval, the diameter of the rod is preferably about 5 to 25 mm and a specific gravity of about 1.5.

d. Step of Calendering

The rod is calendered into the form of sheet at the temperature of about 100 to 150° C., the width of the sheet being about 100 to 300 mm and the thickness about 0.3 to 0.7 mm. Thereafter, the calendered sheet is folded become a three layered sheet and the three layered sheet is passed through in an oven of about 250 to 270° C. at a speed of about 10 to 40 cm per second. This is because there is nonuniform tension between the central part of a 300 mm-width sheet and the edge of the sheet. This process helps the HDME PTFE yarn of the 100 mm-width sheet have a uniform tension compared to that of the 300 mm-width sheet.

The width of a sheet before being folded is not limited to a sheet with a width of 300 mm. For instance, a 80 mm-width sheet is produced when folding a 240 mm-width sheet into three, and a 70 mm-width sheet is produced when folding a 210 mm-width sheet into three. In this process, one OH group of $(OH)_3$ is removed from $Al(OH)_3$ in the PTFE yarn due to the high temperature of about 250 to 270° C.

e. Step of Drawing

The step of drawing of the three-layered sheet is preferably carried out in the manner of multi-drawing. The multi-drawing is carried out with multiple drawing rolls. Preferably, 5 step drawing may be performed with 5 drawing rolls in the present invention. For a preferable embodiment with the 5 step drawing, a three-folded sheet is drawn at a draw ratio of 120% through the first roll, at 50% through the second roll, at 60% through the third roll, at 30% through the fourth roll, and at 15% through the fifth roll.

In this process, two OH groups of $(OH)_3$ are removed from $Al(OH)_3$ of the PTFE yarn, and then aluminum oxide is produced. Aluminum oxide, PTFE, and $MoS_2$ are combined, and such combination is so strong to provide the PTFE yarn with high tensile strength.

During the drawing process, the three-layered sheet is formed with slits repeatedly and continuously. The HDME PTFE yarn has a spider web structure by forming continuously repeated slits in a length direction. A spider web structure can be identified when the HDME PTFE yarn is unrolled in the width direction. The HDME PTFE yarn is rolled up like a string by the tension incurred through the drawing process.

The drawing process may be usually carried out in the machine direction. However, in an embodiment of the present invention, the drawing process may be carried out both in the machine direction and in the transverse direction. Such drawing process can be conducted by an ordinarily skilled person in the art.

f. Step of Slitting

Unless slits are fully formed in the three-layered sheet through the drawing process, a slit process may be further performed. The purpose of the slit process is to make more longitudinal slits repeatedly and continuously. The slit process may refer to a brush or a knife process, and this slit process can be easily conducted by those who skilled in the relevant field of technology.

The HDME PTFE yarn produced by the method of the present invention has a diameter of about 1 to 3 mm and a weight of about 1 to 10 g/m. The HDME PTFE yarn may be produced in the form of a tape with a width of about 3 to 15 mm and a thickness of about 0.2 to 1.0 mm.

FIG. 1 is a picture that shows a spider web structure of a mixed PTFE yarn through opening the central part. When letting the opening part 20 go, the HDME PTFE yarn is rolled up like a string by the inner tension. The HDME PTFE yarn of the present invention can be used for various applications.

Example 1

A liquid dispersion is obtained by dispersing $MoS_2$ 15 wt. % $Al_2O_3$ 1 wt. %, and $Al(OH)_3$ 1 wt. % into PTFE emulsion with 20% solid PTFE. $Na_2CO_3$ 0.01 wt. % is added into the liquid dispersion to obtain a cake type resultant. The cake type resultant is dried for 20 hours at 160° C. to obtain an ingot. The ingot is pulverized in a 35 mesh vibrating to produce mixed PTFE powder.

Kerosene 20 wt. % is added to the mixed PTFE powder as solvent and the resultant is kept at 40° C. for 45 hours. The mixed PTFE powder becomes squash like a taffy. The mixed PTFE powder is extruded in the form of rod at 60° C. The rod is roll-calendered into the form of sheet at 150° C. The sheet has a width of 300 mm and a thickness of 0.7 mm. A three-layered sheet with a width of 100 mm is prepared by folding the 300 mm-width sheet. The three-layered sheet is drawn in five steps at 460° C. i.e. with a draw ratio of 120% at the first roller, with 50% at the second roller, with 60% at the third roller, with 30% at the fourth roller, and with 15% at the fifth roller. An HDME PTFE yarn with a diameter of about 2 mm is obtained from the three-layered sheet.

Comparative Example 1

PTFE powder 83 wt. %, $MoS_2$ 15 wt. %, $Al_2O_3$ 1 wt. %, and $Al(OH)_3$ 1 wt. % are mixed in powder, not using PTFE emulsion. The PTFE powder is a product of DuPont 6J (trademark). A PTFE tape with a width of 5 mm, a thickness of 0.3 mm and the cross section being 1.5 $mm^2$ is obtained through the conventional processes such as compounding of the components, preforming, extrusion, calendaring, and drawing.

Comparative Example 2

This Comparative Example is carried out in the same manner as in Comparative Example 1 except the amounts of the components. A PTFE tape with a width of 3.5 mm, a thickness of 0.6 mm and the cross section being 2.1 $mm^2$ is obtained through the conventional processes as in Comparative Example 1.

Comparative Example 3

This Comparative Example is carried out in the same manner as in Comparative Example 1 except the amounts of the components. A PTFE tape with a width of 4 mm, a thickness of 0.6 mm and the cross section being 2.4 $mm^2$ is obtained through the conventional processes as in Comparative Example 1.

Comparative Example 4

A GFO PTFE tape by W. L. Gore & Associates, Inc. is reproduced as an comparative example in order to compare with the Example of the present invention. The GFO PTFE tape is produced in powder by mixing PTFE powder 84 wt. %, carbon black 15 wt. %, and silicon oil 1 wt. %. This Comparative Example is carried out in the same manner as in Comparative Example 1 except the amounts of the components. A PTFE tape with a width of 12 mm, a thickness of 0.4 mm and the cross section being 4.8 $mm^2$ is obtained through the conventional processes as in Comparative Example 1.

Table 1 shows the amounts of components for Comparative Examples 1-3.

TABLE 1

|  | Comparative Example 1 | Comparative Example 2 | Comparative Example 3 |
| --- | --- | --- | --- |
| PTFE | 83 | 78 | 73 |
| $MoS_2$ | 15 | 20 | 25 |
| $Al_2O_3$ | 1 | 1 | 1 |
| $Al(OH)_3$ | 1 | 1 | 1 |

Table 2 shows the specification of the PTFE tapes and yarn of Example 1 and Comparative Examples 1-4 and the tensile strength.

TABLE 2

|  | Thickness (mm) | Width (mm) | Cross Section (mm²) | Tensile Strength (MPa) |
|---|---|---|---|---|
| Comparative Example 1 | 0.3 | 5 | 1.5 | 23.6 |
| Comparative Example 2 | 0.6 | 3.5 | 2.1 | 17.8 |
| Comparative Example 3 | 0.6 | 4 | 2.4 | 15.8 |
| Comparative Example 4 | 0.4 | 12 | 4.8 | 12.1 |
| Example 1 |  | 2 | — | 93.1 |

Figure 2:
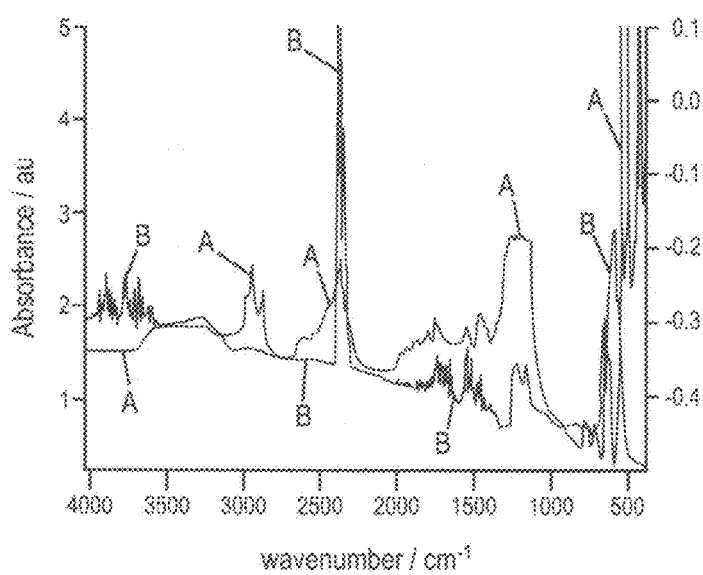
FIG. 2 is a spectrum chart to show IR analyses of both an HDME PTFE yarn of the present invention and a prior PTFE yarn.

IR Analyses:

FIG. 2 is a spectrum chart to show IR analyses of both an HDME PTFE yarn of the present invention and a prior PTFE yarn. A is for Example 1 and B is for Comparative Example 4. A peak around 2300 cm-1 in the spectrum is due to carbon dioxide in the air. In Example 1, a peak area is around 2650 cm-1, and there is also a peak from 2800 to 3000 cm-1. It may be resulted from more mechanical or chemical reactions among PTFE, $MoS_2$, and $Al_2O_3$ rather than a simple compounding effect.

Figure 3A:
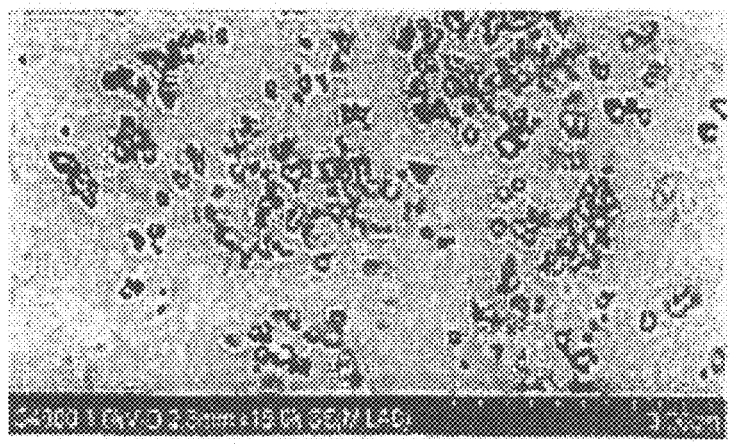
FIG. 3A is a scanning electron microscope (SEM) picture of an HDME PTFE yarn of the present invention, and FIG. 3B a SEM picture of a prior PTFE yarn.
Figure 3B:
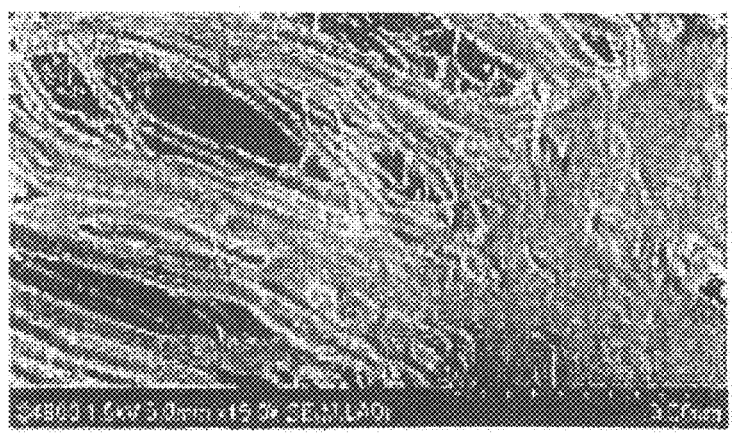

SEM Analyses:

While FIG. 3(a) is a SEM of mixed PTFE yarns of Example 1, FIG. 3(b) is a SEM of the PTFE tape of Comparative Example 4. Many holes are observed in the Comparative Example. The holes might be created by the one directional drawing because every hole heads for the same direction. On the contrary, very few holes are observed in Example 1. Numerous particles, probably aluminum hydroxide, can be found on the surface. In Example 1, the tensile strength is improved because not only aluminum hydroxide plays a role in restraining the yarns' further drawing but also a spider web structure plays a role in enhancing the tensile strength.

Tensile Strength:

Tensile strength is measured for Example 1 and Comparative Examples 1-4. The tensile strength is measured under the conditions of a distance of 200 mm between chucks and a tension speed of 200 mm/min in accordance with JIS-L-1013. Table 2 shows data of the tensile tests. The tensile tests are conducted five times, and the data are represented in average values.

The mixed PTFE tapes of Comparative Examples 1-3 show higher tensile strength than Comparative Example 4. A mixed PTFE yarn of Example 1 shows a remarkable high tensile strength.

The mixed PTFE tapes or mixed PTFE yarns with high tensile strength in accordance with the present invention can be used for not only gland packing but also a timing belt in an internal combustion engine, a v-belt, automobiles, airplanes, high-speed trains, and rockets.

Simple transformations or changes of the present invention can be easily conducted by those who have knowledge of this field, thus it can be seen that these transformations or changes are included in the area of the present invention.

The invention claimed is:

1. A method of preparing mixed polytetrafluoroethylene (PTFE) powder for preparing a high density multi expanded (HDME) PTFE yarn with a high tensile strength, which comprises the steps of:
   preparing a PTFE mixed dispersion by dispersing $MoS_2$, $Al_2O_3$, and $Al(OH)_3$ in PTFE emulsion having 10 to 25% by weight of solid PTFE;
   dehydrating the PTFE mixed dispersion by adding $Na_2CO_3$ into the PTFE mixed dispersion in order to remove the solid PTFE, $MoS_2$, $Al_2O_3$, and $Al(OH)_3$ from the PTFE mixed dispersion to form a cake type compound;
   preparing an ingot by drying the cake type compound for about 16 to 24 hours at the temperature of about 120 to 190° C.; and
   pulverizing the ingot in a 30-35 mesh vibrating net.

2. A mixed polytetrafluoroethylene (PTFE) powder prepared by the method of claim 1 for preparing a high density multi expanded (HDME) PTFE yarn with a high tensile strength.

3. The method of claim 1 wherein said PTFE mixed dispersion comprises PTFE emulsion of 75 to 90 wt. %, $MoS_2$ of 10 to 30 wt. %, $Al_2O_3$ of 1 to 5 wt. %, and $Al(OH)_3$ of 1 to 5 wt. %.

4. A mixed polytetrafluoroethylene (PTFE) powder prepared by the method of claim 3 for preparing a high density multi expanded (HDME) PTFE yarn with a high tensile strength.

5. A method of preparing an HDME PTFE yarn comprising the steps of:
   preparing a mixed PTFE powder according to claim 3;
   adding kerosene of about 18 to 25 wt. % as solvent to the mixed PTFE powder and maintaining the resultant for about 40 to 50 hours at the temperature of about 30 to 50° C.;
   extruding the resulting mixed PTFE into the form of rod at about 70 to 90° C.;
   calendering the rod into the form of sheet at about 100 to 150° C., the width of the sheet being about 100 to 300 mm and the thickness about 0.3 to 0.7 mm;
   folding the sheet to become a three layered sheet and passing through the three layered sheet in an oven of about 250 to 270° C. at a speed of about 10 to 40 cm per second; and
   drawing the three-layered sheet at the temperature of about 450 to 500° C. at the speed of about 30 to 100 cm/s and the drawing ratio of about 200 to 600%.

6. The method of claim 1 wherein $Na_2CO_3$ is added about 0.01 wt. % in the step of dehydrating.

7. A mixed polytetrafluoroethylene (PTFE) powder prepared by the method of claim 6 for preparing a high density multi expanded (HDME) PTFE yarn with a high tensile strength.

8. A method of preparing an HDME PTFE yarn comprising the steps of:
   preparing a mixed PTFE powder according to claim 6;
   adding kerosene of about 18 to 25 wt. % as solvent to the mixed PTFE powder and maintaining the resultant for about 40 to 50 hours at the temperature of about 30 to 50° C.;
   extruding the resulting mixed PTFE into the form of rod at about 70 to 90° C.;
   calendering the rod into the form of sheet at about 100 to 150° C., the width of the sheet being about 100 to 300 mm and the thickness about 0.3 to 0.7 mm;
   folding the sheet to become a three layered sheet and passing through the three layered sheet in an oven of about 250 to 270° C. at a speed of about 10 to 40 cm per second; and
   drawing the three-layered sheet at the temperature of about 450 to 500° C. at the speed of about 30 to 100 cm/s and the drawing ratio of about 200 to 600%.

9. A method of preparing an HDME PTFE yarn comprising the steps of:

preparing a mixed PTFE powder according to claim 1;

adding kerosene of about 18 to 25 wt. % as solvent to the mixed PTFE powder and maintaining the resultant for about 40 to 50 hours at the temperature of about 30 to 50° C.;

extruding the resulting mixed PTFE into the form of rod at about 70 to 90° C.;

calendering the rod into the form of sheet at about 100 to 150° C., the width of the sheet being about 100 to 300 mm and the thickness about 0.3 to 0.7 mm;

folding the sheet to become a three layered sheet and passing through the three layered sheet in an oven of about 250 to 270° C. at a speed of about 10 to 40 cm per second; and drawing the three-layered sheet at the temperature of about 450 to 500° C. at the speed of about 30 to 100 cm/s and the drawing ratio of about 200 to 600%.

10. The method of claim 9 in which the cross section of the rod is circular or oval.

11. An HDME PTFE yarn prepared by the method of claim 9.

12. The HDME PTFE yarn of claim 11, having a diameter of about 1 to 3 mm and a weight of about 1 to 10 grams per meter.

13. The method of claim 9, which further comprises a step of drying in which said mixed PTFE powder is kept at a low temperature of about 1 to 3° C. for about 20 to 30 hours before taking the step of extruding.

14. An HDME PTFE yarn prepared by the method of claim 13.

15. The method of claim 9 in which the step of drawing in the manner of multi-drawing.

16. An HDME PTFE yarn prepared by the method of claim 15.

17. The method of claim 15 in which said multi-drawing is carried out by a 5 step drawing in which the three-folded sheet is drawn at a draw ratio of 120% through the first roll, at 50% through the second roll, at 60% through the third roll, at 30% through the fourth roll, and at 15% through the fifth roll.

18. An HDME PTFE yarn prepared by the method of claim 17.

19. The method of claim 17, which further comprises a step of slitting to form longitudinal slits repeatedly and continuously in the longitudinal direction.

20. An HDME PTFE yarn prepared by the method of claim 19.

* * * * *